Patented Oct. 16, 1928.

1,687,936

UNITED STATES PATENT OFFICE.

ALBERT E. GREENE, OF MEDINA, WASHINGTON.

ELECTRIC FURNACE AND METHOD OF OPERATION.

No Drawing. Application filed May 18, 1925. Serial No. 31,214

My present invention relates to improvements in electric steel melting and more particularly to the method of treating steel or iron to incorporate silicon therein.

In the production of steel in electric furnaces I have found it advantageous to reduce the silicon into the metal by reducing action on the material on top of the metal so that silicon is reduced therefrom. This improvement is more fully described in my U. S. Patents 1,185,394 and 1,449,319 and 1,449,094 and the reduction of silicon is also described in my U. S. Patent No. 1,532,052.

Heretofore, the process of melting and finishing steel in an electric furnace where the metal was deoxidized in the furnace under the action of a slag included the step of treating the slag by means of a reducing agent to deoxidize the slag and reduce the iron oxide in it and also to even reduce silicon which was present in the slag in acid lined furnaces, with the final object of getting rid of the oxides and gases in the steel. In my previous work I had found that the iron oxide could be readily reduced from the slag by combining with the silica present a basic oxide such as lime or alumina forming a more or less neutralized combination from which the iron oxide would reduce more readily under the action of an added carbonaceous or other reducing agent. It is well known that the affinity of the basic oxide for the silica in such a slag is such as to make it more difficult to reduce the silica; that is the pulling action of the CaO which holds the $SiO_2$ must be overcome in order to reduce the silica. This can easily be done and is often done unintentionally when a heat of steel is held in an acid lined furnace under influence of carbon on such a slag especially when the temperature is high and the heat is not tapped from the furnace when it is ready to pour. Altho the slower action of removing oxide of iron from the slag which takes place when a reducing agent is added after the metal is melted or partly melted and covered with slag is helpful, I have discovered that the deoxidation and degasifying of the steel can be improved by the process which is more fully described below.

My present invention relates to the application of my discovery to the deoxidizing and finishing of steel in an electric furnace. It relates more particularly to the method of getting the silicon reduced and into the metal beneath the slag. My discovery is that when a shovel of silica sand, which is practically pure silica, is thrown on top of the hot and molten slag on the steel bath after the steel is all melted and ready to be finally deoxidized, that this silica in what may be called concentrated form will react with carbon also added right after and on top of the silica and that a very quick reduction of silica takes place, under the influence of the arc. By throwing the sand as much as possible in one place immediately under the electrode this reducing action is more effectively accomplished, than were the sand spread out all over the slag bath. It is easy to see how this effect is had, because the silica sand is not thus subjected to first a fluxing with lime which must then be counteracted before the silicon can be reduced from it; but on the contrary the sand and carbon added directly under the electrode where the mixture is subjected to intense heat, not only from the bath beneath but also from the arc, react quickly with the formation of reduced silicon which finds its way down into the metal beneath and there accomplishes its work of deoxidizing and degasifying with increased rapidity.

This sand addition is made on top of the slag. It is not intended to take the place of slag but is an addition to it. Were it necessary to make a new slag on the bath of metal, this should be done in the usual way prior to the use of my improved method which serves as a modification of the usual process.

Thus in carrying out the process of my invention I bring the charge of steel in the electric furnace to the final stage where it is covered with a slag and ready for the final deoxidizing. Part of the deoxidizing may have already been accomplished so that iron oxide may have already been partly or largely removed from the slag, but my treatment aids in the final action on the metal under the slag and accomplishes its purpose in this regard more rapidly because of the quick effect and the quick passage of reduced silicon down into the metal.

My process is practiced especially in acid or neutral lined furnaces and is more particularly an acid process refinement. The furnace hearth may be of silica or may contain alumina, but I do not limit my process to furnaces with linings of these materials.

Silicon may in this manner be reduced into a bath of steel or iron, either to deoxidize or else to raise the silicon content of the metal.

The method has the advantage that the silicon is more readily reduced under the strong reducing conditions due to the presence of silica, carbon and high heat. The silica sand or silica containing material may be thrown on top of the finishing slag of a steel heat, or on top of the bare metal. Care is taken to prevent the carbon getting in contact with the metal of the bath when such contact would be detrimental as in the case of low carbon steel.

Reduction of the silicon from the silica is evidenced often by the presence of the fluffy condensation product which appears to come from the vaporized silicon when it comes into contact with the air and oxidizes.

What I claim is:—

1. The method of making and finishing a heat of steel in an electric arc furnace, said method consisting in producing a bath of molten steel in the furnace and a covering of slag, and after the steel is all melted and ready for the finishing deoxidizing treatment, adding a shovel of silica sand under an electrode on top of the slag and adding a carbonaceous reducing agent on top of the sand thus added and subjecting the mixture to the heat of the arc until silica is reduced and the steel underneath is deoxidized and finished.

2. The method of making and treating steel in an electric arc furnace, said method consisting in producing a molten bath of steel and slag thereon, and then adding pure silica material under an electrode together with carbon to reduce it, and causing the reduction to take place under the heat of the arc, and causing a rapid reduction of silicon which enters the metal and speeds up the deoxidation process.

3. In the method of making steel in an electric arc furnace having an acid lining, the finishing step which consists of adding silica sand under an electrode together with carbonaceous material to reduce it, this addition being made on top of the slag covering the bath, and heating this by the arc until reduction of silicon is evidenced by the formation of the grayish fluffy condensation product which comes from the furnace into the air.

In witness whereof, I hereunto subscribe my name this 7th day of May, 1925.

ALBERT E. GREENE.